United States Patent [19]
Natsume et al.

[11] Patent Number: 6,078,404
[45] Date of Patent: Jun. 20, 2000

[54] IMAGE FORMING APPARATUS THAT CAN APPROPRIATELY PROCESS IMAGE OF ORIGINAL STORED IN MEMORY

[75] Inventors: Junko Natsume, Aichi; Hiroshi Yamada, Toyokawa; Kazuo Inui, Toyohashi, all of Japan

[73] Assignee: Minolta Co., Ltd., Osaka, Japan

[21] Appl. No.: 08/948,414

[22] Filed: Oct. 9, 1997

[30] Foreign Application Priority Data

Mar. 12, 1997 [JP] Japan ..................................... 9-057776

[51] Int. Cl.⁷ .................................................. G06K 15/00
[52] U.S. Cl. ........................................... 358/1.2; 358/1.18
[58] Field of Search ..................................... 395/101, 113, 395/112, 114, 115, 826, 827, 834, 840, 841, 872, 874, 885, 892, 893; 707/527; 358/401, 403

[56] References Cited

U.S. PATENT DOCUMENTS 4,991,972  2/1991  Ikenoue et al. .

5,164,842  11/1992  Gauronski et al. ..................... 395/401

FOREIGN PATENT DOCUMENTS 61-061178  3/1986  Japan .
04037916  2/1992  Japan .

*Primary Examiner*—Arthur G. Evans
*Attorney, Agent, or Firm*—McDermott, Will & Emery

[57] ABSTRACT

A copy machine can store image data corresponding to a plurality of original groups. The user can carry out an editing process such as confirmation, erasure, and modification, and the like on the stored image data. A control unit of the copy machine provides control so that, when printing of a previous job has ended, and the mode to confirm, erase or modify the image data of a registered original group is not selected, printing of a next job is initiated if there is a job to be printed out. When the edit mode is selected, the control returns to the main routine. Therefore, printing of a job subsequent to the job that has been ended will not be initiated. Thus, a copy machine can be provided that can appropriately process image data of a registered original group.

20 Claims, 14 Drawing Sheets

③ JOB ERASE

ERASE THIS JOB?

531    532
YES    NO

③ JOB MODE MODIFY    MODIFY CANCEL

SELECT MODE TO BE MODIFIED
NUMBER OF COPY CAN BE MODIFIED BY TEN KEY    999
MODE THAT CAN BE MODIFIED    OK 541              542              543
FINISHING   ORIGINAL → COPY   SHEET 544              545              546
DATE         PAGE         ADMINISTRATION NUMBER

547
FORMAT PRINT

IMAGE FORMING APPARATUS THAT CAN APPROPRIATELY PROCESS IMAGE OF ORIGINAL STORED IN MEMORY

BACKGROUND OF THE INVENTION

1. Field of the Invention

The present invention relates to image forming apparatuses, and more specifically, to an image forming apparatus that can store and edit a plurality of image data that has coherence as a group of originals.

2. Description of the Related Art

Some conventional image forming apparatuses such as a copying machine or a printer are known to have a multi-job function. This multi-job function allows an image to be read in while printing out another image. Image reading and image printing with respect to a plurality of groups of originals can be carried out independently. In such an image forming apparatus with a multi-job function, the image data of the read plurality of groups of originals are stored in a storage device.

Some of the above image forming apparatuses have the function to display information concerning the stored image data corresponding to a plurality of groups of originals. The displayed information includes whether the registered job (a series of processes for a group of originals) attains a standby state for transmission or attains a state of currently receiving data. The user can carry out appropriate processes such as modifying the print mode with respect to image data of a certain job, deleting image data, and the like while confirming the display (display on the confirmation screen for stored text).

The above-described image forming apparatus continues the process for a plurality of jobs such as reading and printing out image data even when the job information is provided on a display in a screen for the stored text. For example, when the user provides display of information of a job that attains a transmission standby state on the stored text display screen in order to delete that job and the process for that job is now due, the transmission operation of that job will be initiated unintentionally.

SUMMARY OF THE INVENTION

An object of the present invention is to provide an image forming apparatus with a multi-job function that allows the user to appropriately process an image with respect to a stored group of originals.

Another object of the present invention is to inhibit initiation of output of a new job during an editing process of image data of a stored job in an image forming apparatus.

A further object of the present invention is to inhibit image output not intended by the user in an image forming apparatus with a multi-job function.

The above objects of the present invention can be achieved by an image forming apparatus set forth in the following.

According to an aspect of the present invention, an image forming apparatus that can sequentially read a plurality of original groups while simultaneously forming an image of a read original group, includes an input unit for reading an original and entering image data, a memory for storing entered image data, an editor for editing image data stored in the memory, and an inhibit unit for inhibiting output of the original groups stored in the memory during an editing process by the editor.

Control is provided so that output of an original group stored in the memory is not initiated during an edit process of the stored image data of a job. This eliminates the inconvenience of an image of an original group that is to be edited by the user from being output. The user can appropriately process the image with respect to the stored original group.

According to another aspect of the present invention, an image forming apparatus includes a memory for storing a plurality of original groups, a printer for sequentially printing out the plurality of original groups stored in the memory, an editor for applying an editing process on an original group stored in the memory, and an inhibit unit for inhibiting printing of an original group that is currently being edited.

Control is provided so that output of a job that is currently being edited is not initiated during the editing process of the image data of that job stored in the memory. This eliminates the problem that an image not intended by the user is output.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
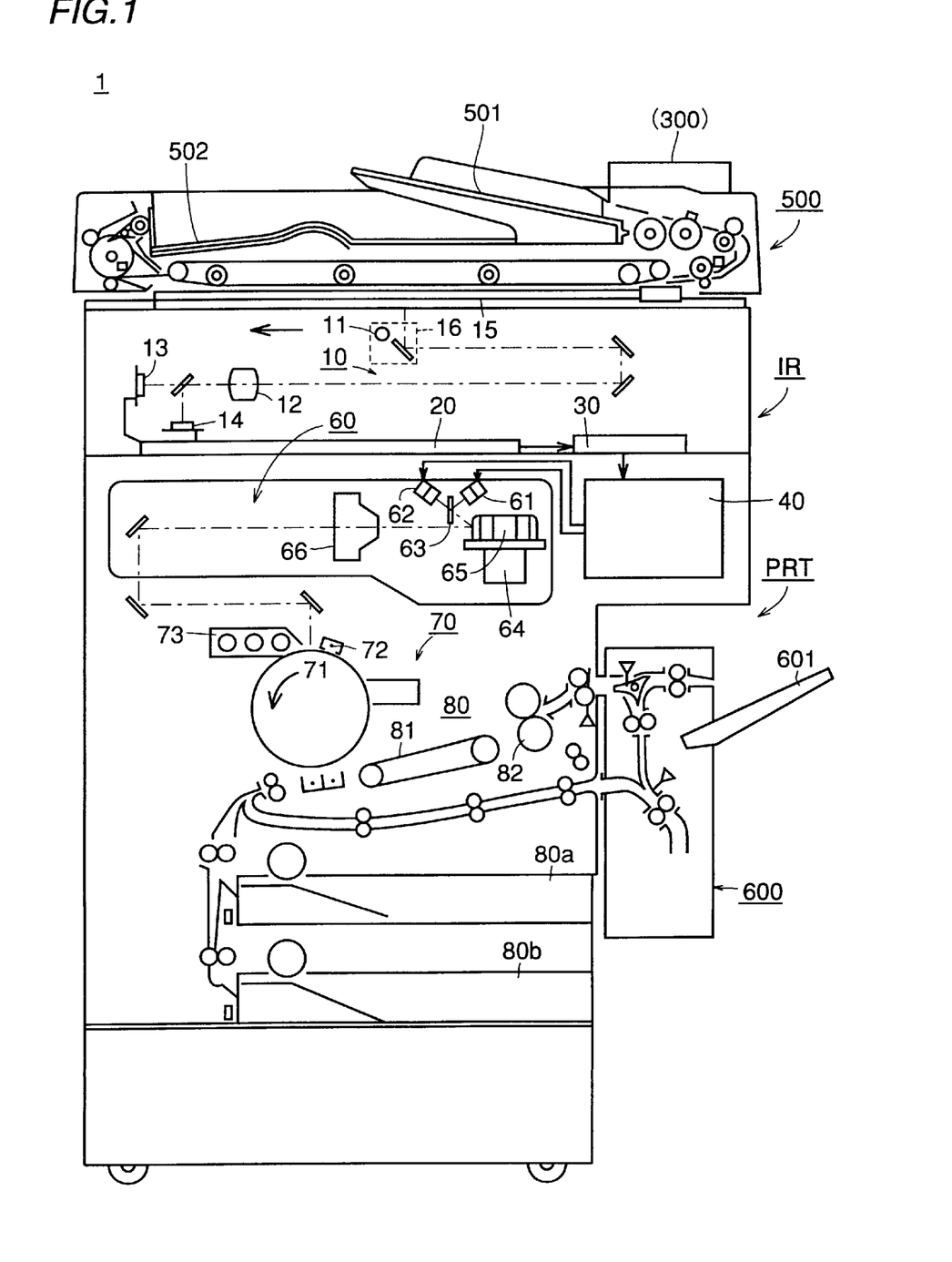
FIG. 1 is a schematic sectional view of a copy machine according to a first embodiment of the present invention.

A copy machine which is a first embodiment of the present invention will be described hereinafter with reference to the drawings. Referring to FIG. 1, a copy machine 1 includes an image reader IR for reading out an image of an original for generating image data, a memory unit 30 for temporarily storing image data obtained by image reader IR, a printer device PRT for printing out on a copy sheet according to image data stored in memory unit 30, an operation panel 300 (on top surface (perpendicular to the plane of the drawing sheet) on copy machine 1) for entering specific operations, an original transport unit 500 for conveying an original document and inverting the top and back sides of the original if necessary, and a refeed unit 600 for inverting the top and back sides, if necessary, of a copy sheet after one copy pass to refeed the copy sheet to printer device PRT. The operation thereof is controlled by a control unit not shown. The structure of the control unit will be described afterwards.

When print out is specified, the original placed on an original feed tray 501 in original transport unit 500 is automatically set at the read out position on platen glass 15 starting from the bottom sheet of the original documents. When the read out operation by image reader IR is completed, the original is discharged on a discharge tray 502.

Image reader IR includes a scanning system 10 and an image signal processing unit 20. In scanning system 10, the image of an original set at the read out position is exposed by an exposure lamp 11 attached to scanner 16 that travels below the original. The reflected light from the original passes through a reflection mirror and a condenser lens 12 to enter photoelectric conversion elements 13 and 14 formed of a CCD array and the like. The signal obtained by scanning system 10 is provided to image signal processing unit 20. Image signal processing unit 20 carries out various image processes such as binarization, picture quality correction, scale magnification, and image editing on the input signal. The processed image data is stored in memory unit 30.

Printer device PRT includes a print processing unit 40, an optical system 60, an image forming system 70, and a sheet transport system 80. Print processing unit 40 drives optical system 60 according to the image data from memory unit 30. In optical system 60, semiconductor lasers 61 and 62 respectively emit a laser beam according to a signal under control of print processing unit 40. The laser beams are combined by a dichroic mirror 63 and reflected by a polygon mirror 65 that is rotated by a mirror 64 to be directed towards a photoconductor 71 of image forming system 70 through a main lens 66.

In image forming system 70, photoconductor 71 is charged by a corona charger 72. Then, a laser beam is emitted from optical system 60, whereby an electrostatic latent image is formed on photoconductor 71. Then, toner is provided on the electrostatic latent image by a developing unit 73. The toner image on photoconductor 71 is transferred on a copy sheet fed out from a sheet feed cassette 80a or 80b of sheet transport system 80. The sheet is conveyed to a fixing unit 82 by a sheet transport belt 81. The toner is fixed to the sheet by heat and pressure. Then the copy sheet is discharged on a discharge tray 601 of refeeding unit 600.

In copy machine 1, an error such as sheet jamming and the like can be detected in original transport unit 500 and printer device PRT during operation. Also, a sheet-out error in sheet feed cassettes 80a and 80b in printer device PRT, and an error of a misplaced document at the readout position in original transport unit 500 can be detected. Furthermore, cessation of the operation of copy machine 1 by malfunction and the like can be detected.

Figure 2:
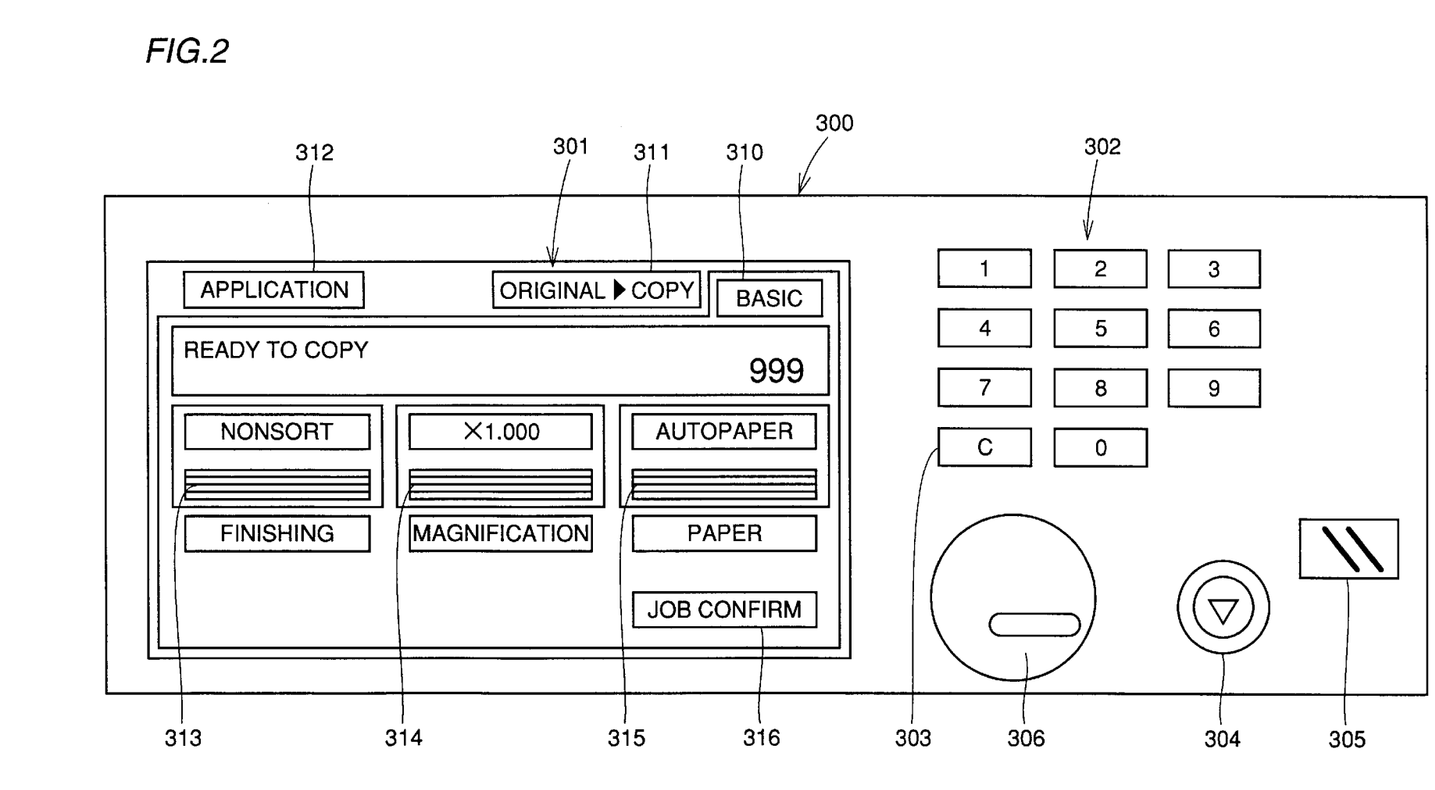
FIG. 2 is a plan view showing a structure of an operation panel.

FIG. 2 is a plan view showing a structure of an operation panel 300.

A touch panel 301 on operation panel 300 provides a display of a basic screen. This basic screen is displayed right after turning the power on or when the panel is reset. On the screen are provided touch keys 310, 311, and 312 for selecting the three major items of "BASIC", "ORIGINAL→COPY" and "APPLICATION". Also, touch keys 313, 314 and 315 for selecting the sub items of "FINISHING", "ZOOM", and "SHEET" are provided on touch panel 301. Key input can be effected by depressing an appropriate touch key on touch panel 301. A job confirm key 316 is also provided on touch panel 301. The user can display and confirm the contents of a registered job by depressing job confirm key 316.

A ten-key 302 is used to enter numeric values such as the number of copies, copy zoom rate, and the like. A clear key 303 is used to clear the numeric values entered via ten-key 302. A start key 306 is used to initiate a copy operation. A stop key 304 is used to stop a currently carried out copy operation. A panel reset key 305 is used to reset the copy condition set through an operation on the screen of touch panel 301 back to the initial condition.

Figure 3:
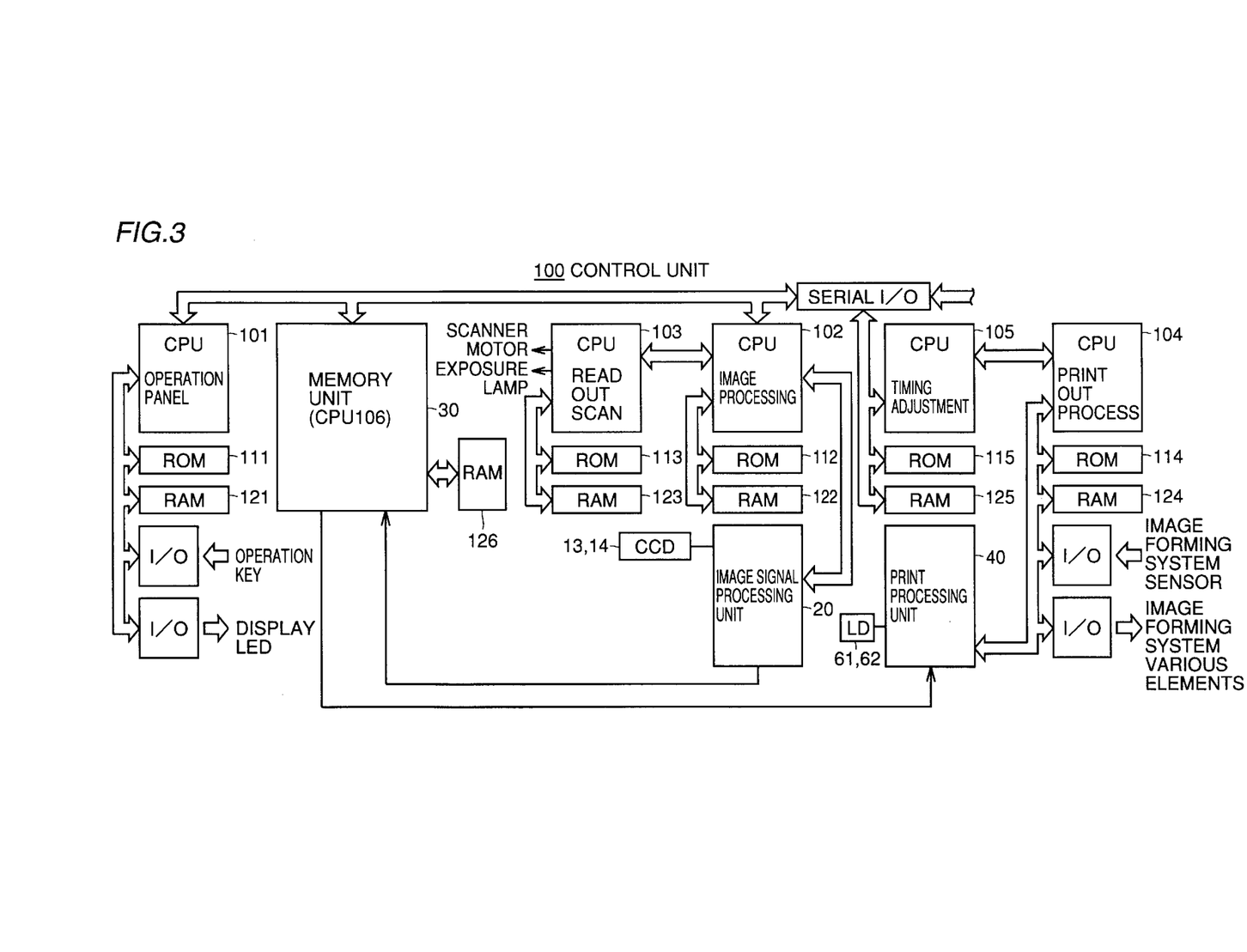
FIGS. 3 and 4 are first and second block diagrams, respectively, for describing a structure of a control unit of a copy machine.
Figure 4:
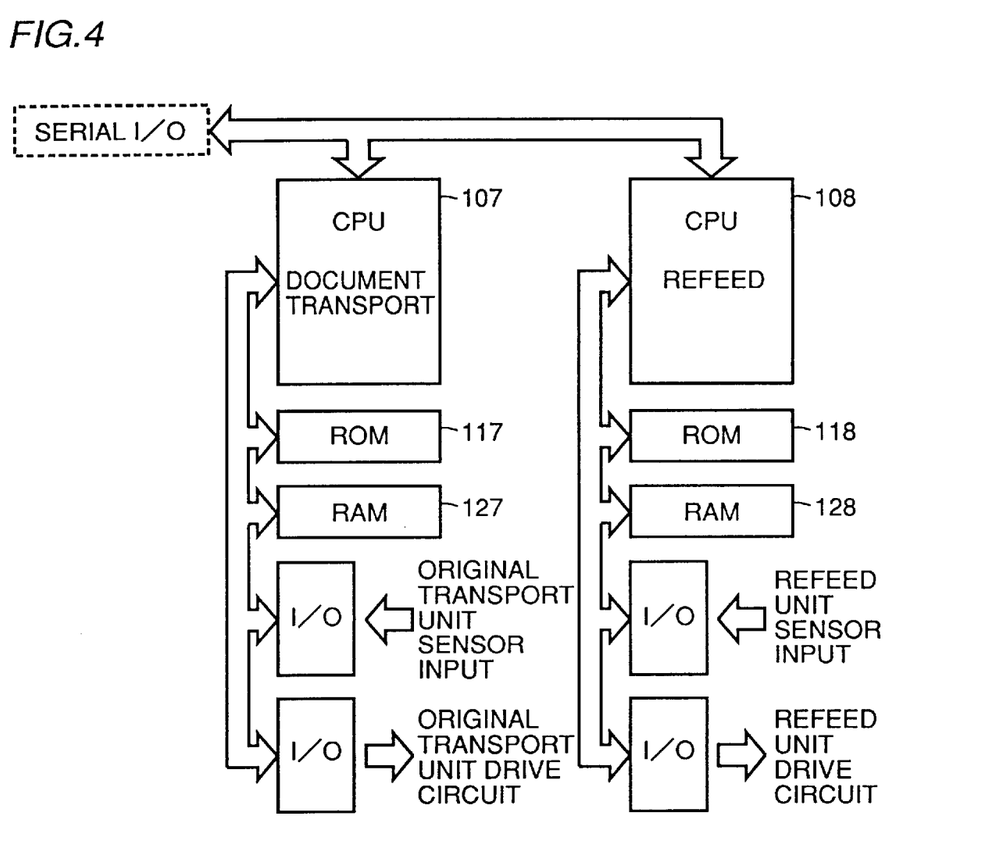

Control unit 100 will be described hereinafter with reference to the block diagrams of FIGS. 3 and 4.

Control unit 100 is formed mainly of eight CPUs 101–108. ROMs 111–118 in which respective programs are stored, and RAMs 121–128 serving as the work area for program execution are provided for CPUs 101–118. It is to be noted that CPU 106 is provided in memory unit 30.

CPU 101 provides control associated with signal input and display through various operation keys on operation panel 300. CPU 102 provides control of each component in image signal processing unit 20. CPU 103 controls the drive of scanning system 10. CPU 104 controls print processing unit 40, optical system 60, and image forming system 70. CPU 105 carries out the process for the entire timing adjustment of control unit 100 and setting an operation mode.

CPU 106 controls memory unit 30 so that the read image data is once stored in the memory, and then read out to be provided to print processing unit 40. Accordingly, image reader IR and printer device PRT are controlled independently to improve the speed of the copy operation.

CPU 107 controls original transport unit 500. CPU 108 controls refeed unit 600. Serial communication by interruption is carried out among these CPUs 101–108 to transfer data.

Figure 5:
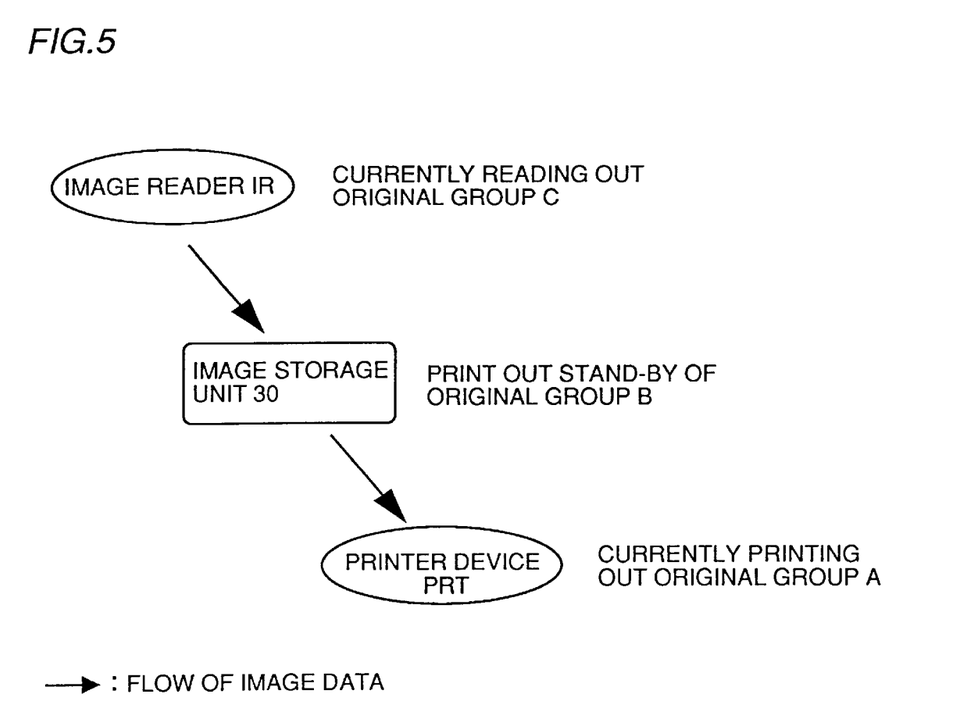
FIG. 5 is a diagram for describing a multi-job function of a copy machine.

Copy machine 1 of the above-described structure includes a multi-job function. FIG. 5 is a diagram for describing the multi-job function of copy machine 1.

The process of obtaining a copy from a set original by copy machine 1 is divided mainly into 3 processes. Namely, a process for reading an original image for generating image data, a process for correcting and storing image data, and a process for printing out according to the stored image data. By carrying out the series of these three processes on a group of originals in the above sequence, a copy of the original group is obtained. The three processes are carried out by image reader IR, memory unit 30, and printer device PRT, respectively.

The multi-job carried out by copy machine 1 includes the operation of, during output of a copy of an original group A by printer device PRT, storing an original group B differing from original group A into memory unit 30 while reading out another original group C by image reader IR. By virtue of the multi-job function, a print operation, a read operation, and an image write operation into memory unit 30 are carried out independently. The process carried out by copy machine 1 for each group of original is also called "job" hereinafter.

Since a print operation and a read operation are carried out independently, cessation in the operation of either printing or reading caused by a trouble will not cause the other operation to stop during simultaneous operation. The other operation can be continued.

The user operation procedure at copy machine 1 will be described with reference to FIGS. 6–11.

Figure 7:
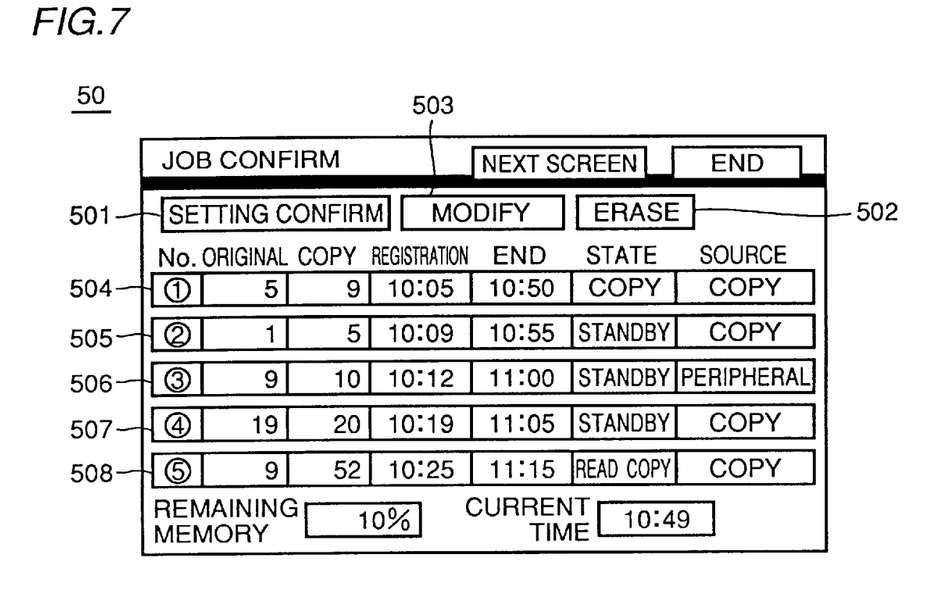
FIG. 7 is a diagram for describing the "job confirm" display of FIG. 6.

When the user depresses a job confirm key 316 on 997217 touch panel 301 shown in FIG. 2, a "job confirm" display 50 shown in FIG. 7 is provided. "Job confirm" display 50 includes the display of a "setting confirm" key 501 for confirming the print mode set for the selected job, an "erase" key 502 for canceling the selected job, a "modify" key 503 for modifying the print mode set for the selected job, and job select keys 504–508 to select an appropriate job.

Job select keys 504–508 serve to provide a display of the information of jobs stored in copy machine 1. A job corresponding to respective registration numbers 1–5 can be selected by depressing an appropriate job select key.

Under the state where any of job select keys 504–508 is selected, the user can depress any of "setting confirm" key 501, "erase" key 502 and "modify" key 503 to carry out a setting confirmation, erasure, and modification process on the job selected by the user.

Figure 8:
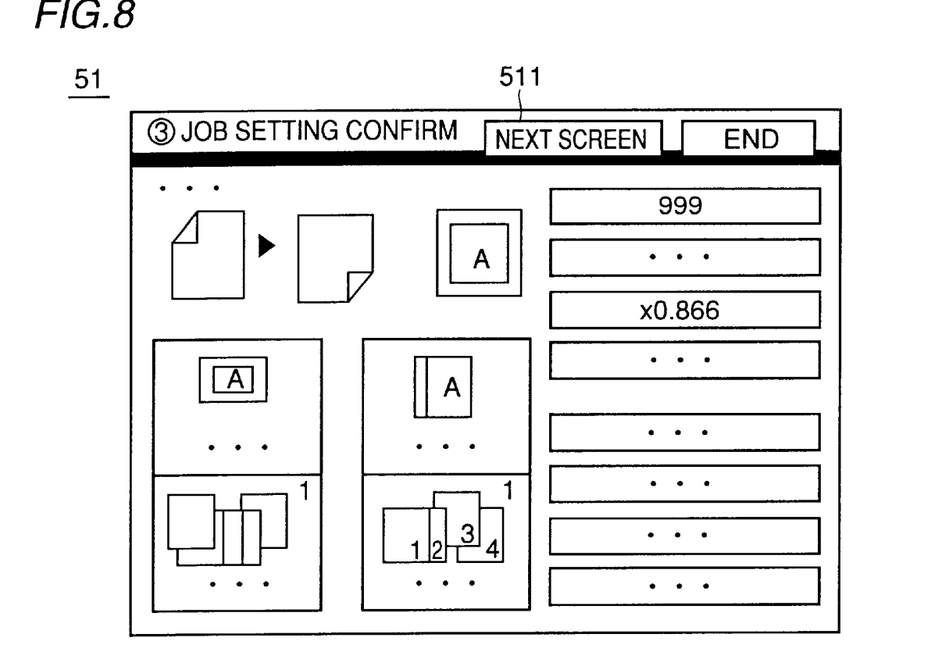
FIGS. 8 and 9 show a "job setting confirm" display that is provided by depressing a job select key corresponding to the job of registration number 3 and a "setting confirm" key.
Figure 9:
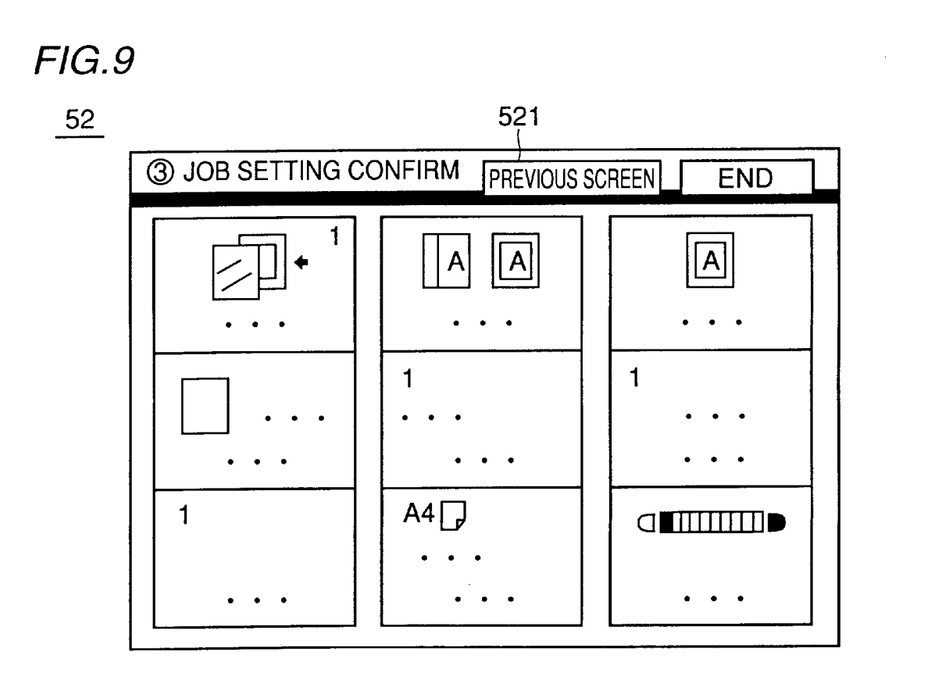

FIGS. 8 and 9 are "job setting confirm" displays 51 and 52, respectively, shown by depressing job select key 506 corresponding to the job of registration number 3 and "setting confirm" key 501.

Depression of a "next screen" key 511 on "job setting confirm" display 51 causes the screen of touch panel 301 to show "job setting confirm" display 52. Depressing a "previous screen" key 521 on "job setting confirm" display 52 causes the screen of touch panel 301 to display "job setting confirm" display 51. The user can confirm the print mode set by the job of registration number 3 through "job setting confirm" displays 51 and 52.

Figure 10:
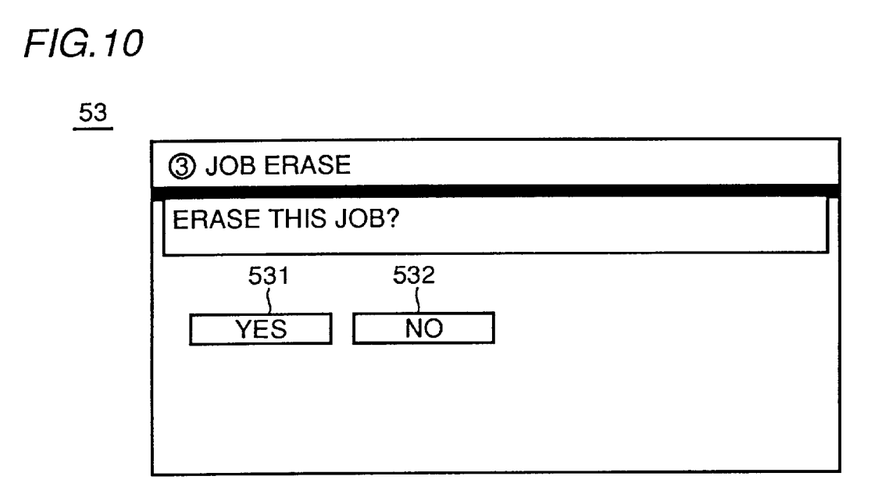
FIG. 10 shows a "job erase" display provided by depressing a job select key corresponding to the job of registration number 3 and an "erase" key.

FIG. 10 shows a "job erase" display 53 that is provided by depressing job select key 506 corresponding to the job of registration number 3 and "erase" key 502.

When the user depresses "yes" key 531, the job of registration number 3 is erased. The screen of touch panel 301 returns to "job confirm" display 50. If the user depresses "no" key 532, the screen of touch panel 301 returns to "job confirm" display 50 without the job of registration number 3 being erased.

Figure 11:
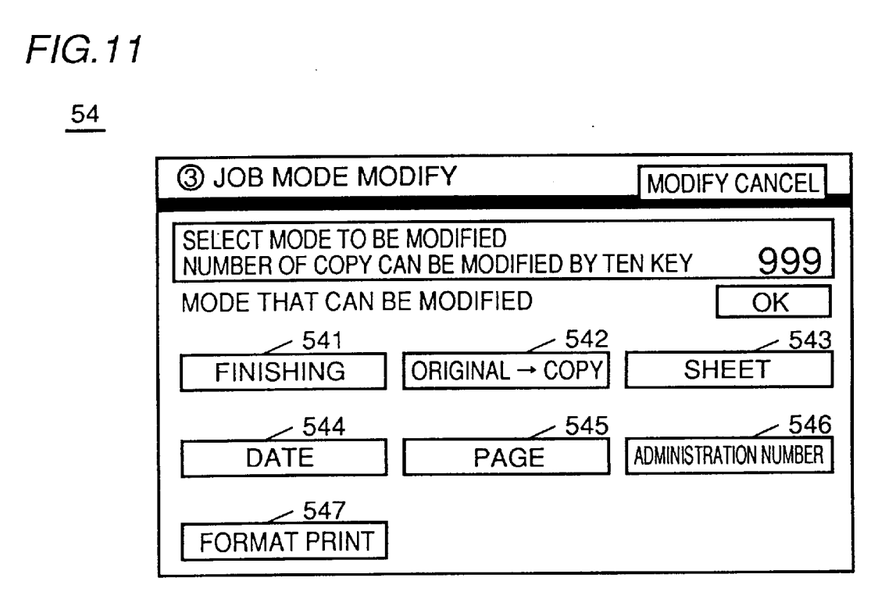
FIG. 11 shows a "job mode modify" display provided by depressing a job select key corresponding to the job of registration number 3 and a "modify" key.

FIG. 11 shows a "job mode modify" display 54 that is provided by depressing job select key 506 corresponding to the job of registration number 3 and "modify" key 503.

Figure 6:
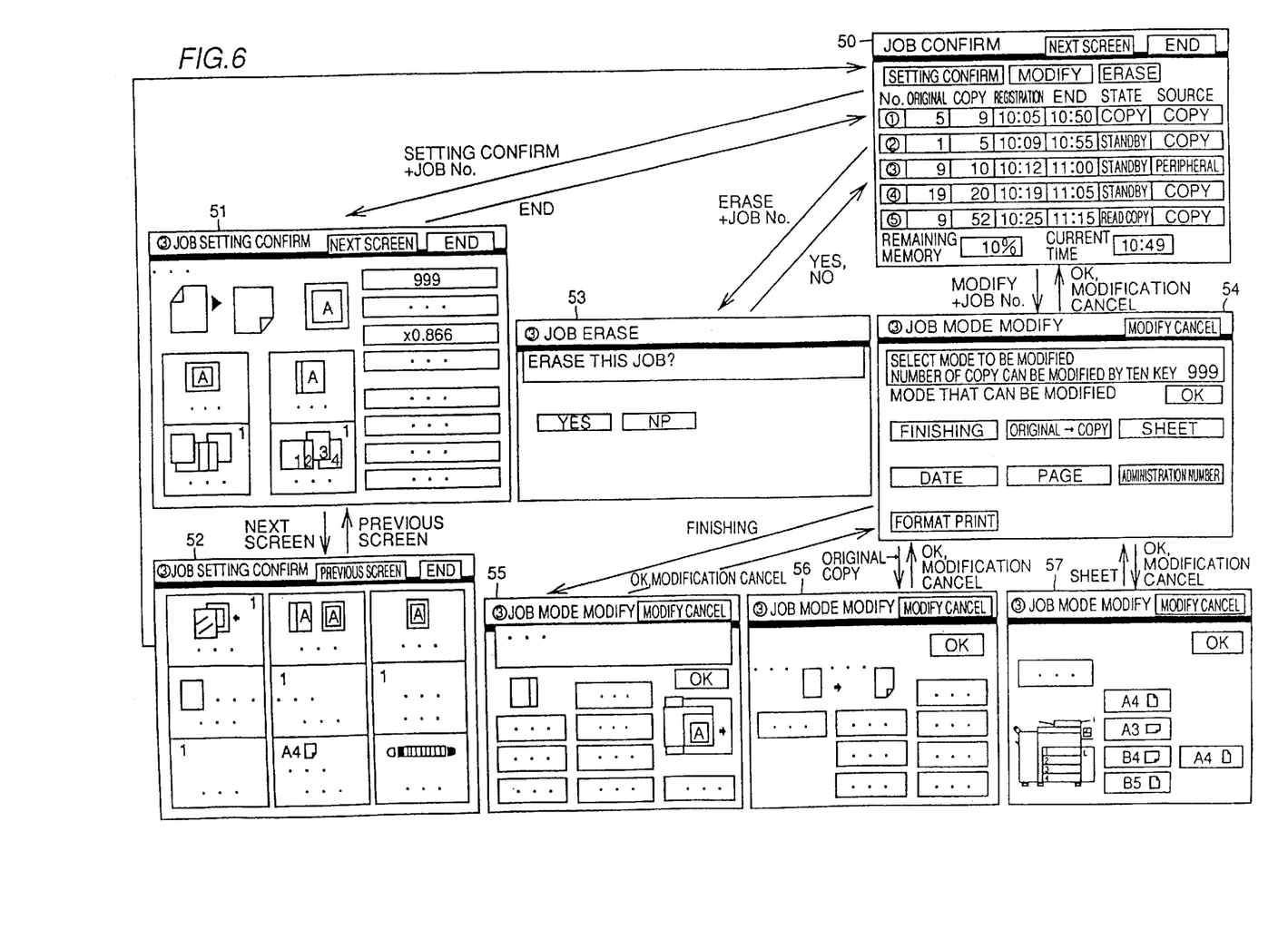
FIG. 6 is a diagram for describing the transition of the display on a touch panel through manipulation of a user.

Depression of any of "finishing" key 541, "original→copy" key 542, and "sheet" key 543 causes the screen of touch panel 301 to display a "finishing modify" display 55, "original→copy modify" display 56, and "sheet modify" display 57, respectively (refer to FIG. 6). The user can modify the print mode of "finishing", "original→copy" and "sheet" for the job of registration number 3.

By depression of any of "date" key 544, "page" key 545, and "administration number" key 546, and "format printing" key 547, the user can modify the print mode of "date", "page", "administration number", and "format printing", and "format printing" for the job of registration number 3.

The present invention is achieved by the control set forth in the following in copy machine 1 that can carry out the above processes for an appropriate job. The control procedure carried out by the CPU of the present invention including CPUs 101–108 (FIGS. 3 and 4) will be described with reference to the flow chart of the main routine of FIG. 12.

Figure 12:
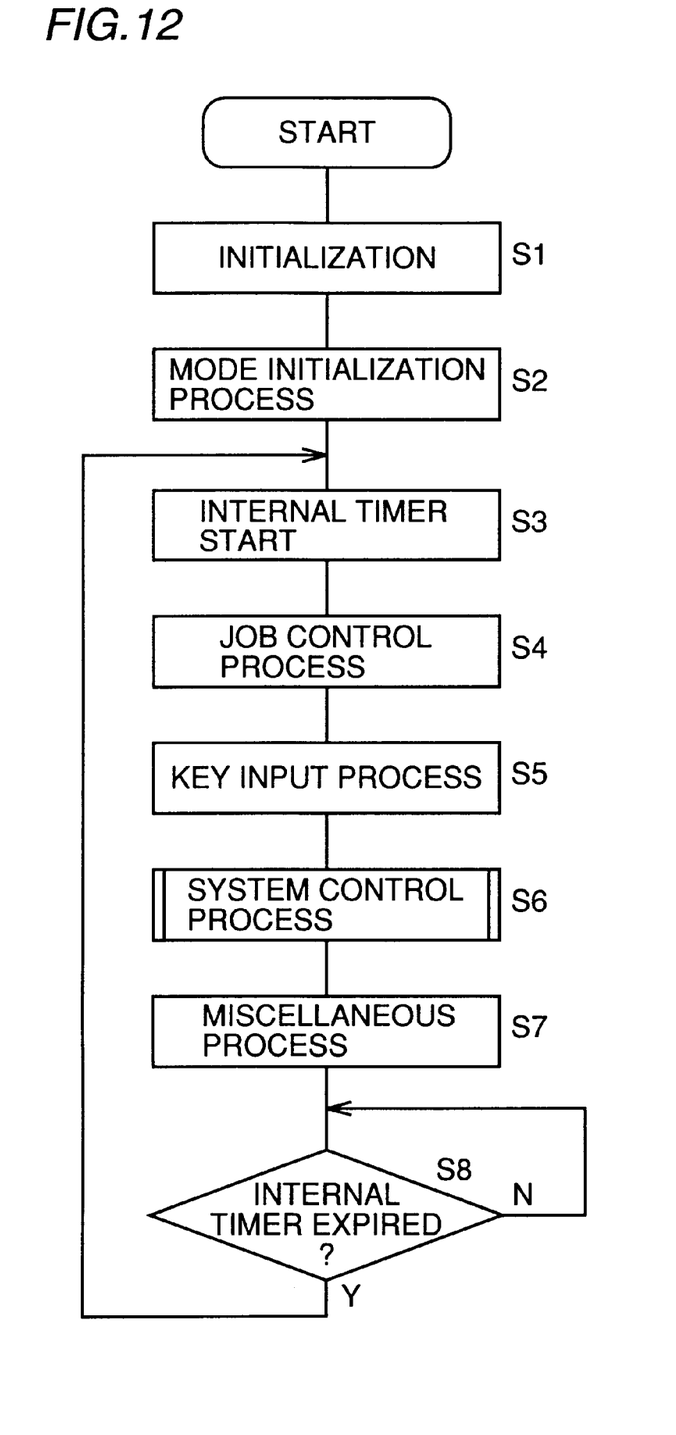
FIG. 12 is a flow chart of the main routine showing the control procedure carried out by a CPU.

When the power of copy machine 1 is turned on and the CPU reset, the program is commenced. At step 1 (step abbreviated as S hereinafter), initialization of the CPU is carried out such as clearing the RAM and setting various registers. At step S2, a mode initialization process of copy machine 1 is carried out. At S3, the counting of an internal timer incorporated in the CPU is initiated. The value counted by the internal timer defines the length of one routine. The value thereof is preset at the initialization of S1.

At S4, the state of the registered job is determined. At step S5, any input through touch panel 301 and hard keys 302–306 (refer to FIG. 2) is processed. At S6, the overall operation of copy machine 1 is controlled. At S7, miscellaneous process is carried out. The system control process of S6 is carried out by the subroutine that will be described afterwards.

At S8, determination is made whether the internal timer set at S3 has expired or not. If YES at S8, that routine ends. The control returns to the process of S3. If the internal timer has not yet expired (NO at S8), the control remains at S8 to wait for the expiration of the internal timer.

Figure 13:
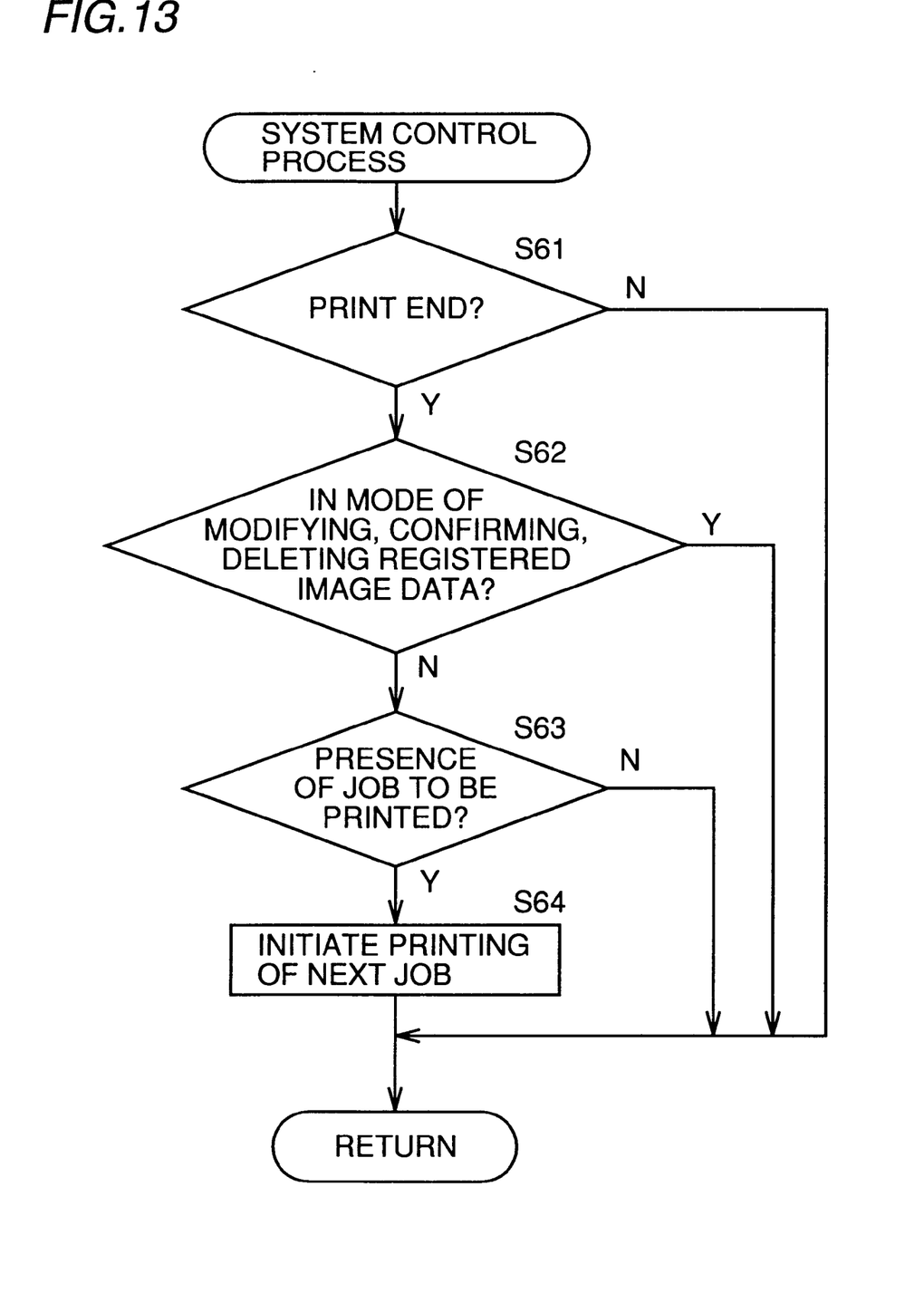
FIG. 13 is a flow chart showing the subroutine of a system control process of S6 of FIG. 12.

FIG. 13 is a flow chart of the subroutine of the system control process of S6.

At S61, determination is made whether printing has ended or not. When NO at S61, the control returns to the main routine. If printing has ended (YES at S61), control proceeds to S62 to determine whether a flag is set indicating that a mode is selected (corresponding to the user operation shown in FIGS. 8–11) to confirm, erase, and modify the image data of the registered original group through operation panel 300 (refer to FIG. 2).

When a flag indicating that this mode is selected is set (YES at S62), the control returns to the main routine. A printing operation of a job subsequent to the printed out job of S61 will not be initiated when the mode to confirm, erase, and modify the image data of the registered original group is selected. Thus, print out of an image of a job that is to be confirmed, erased, or modified is inhibited contrary to the conventional case.

When a flag is not set indicating that the edit mode is selected (NO at S62), the control proceeds to step S63 to determine whether there is a job waiting to be printed. When NO at S63, the control returns to the main routine. If there is a job to be printed (YES at S63), the control proceeds to S64 to initiate print out of the next job. Thus, following confirmation, erasure, and modification of the image data of a registered original group, print out of the next job is automatically initiated.

When the mode to confirm, erase, or modify the image data of the registered original group is selected, the print out of the next job is suppressed until selection of the edit mode is completed. The print out of the next job is automatically initiated when the selection of the edit mode ends. Thus, the user can appropriately process the image data of a registered original group.

A copy machine according to second to fourth embodiments of the present invention will be described hereinafter with reference to FIGS. 14–16. The copy machine of the second to fourth embodiments differs from the copy machine of the first embodiment in the system control process shown in FIG. 13. In the copy machine of the second to fourth embodiments, the entire structure of the copy machine excluding the system control process, the structure of the control unit, and the user operation shown in FIGS. 6–11 are identical to those of copy machine 1 of the first embodiment.

Figure 14:
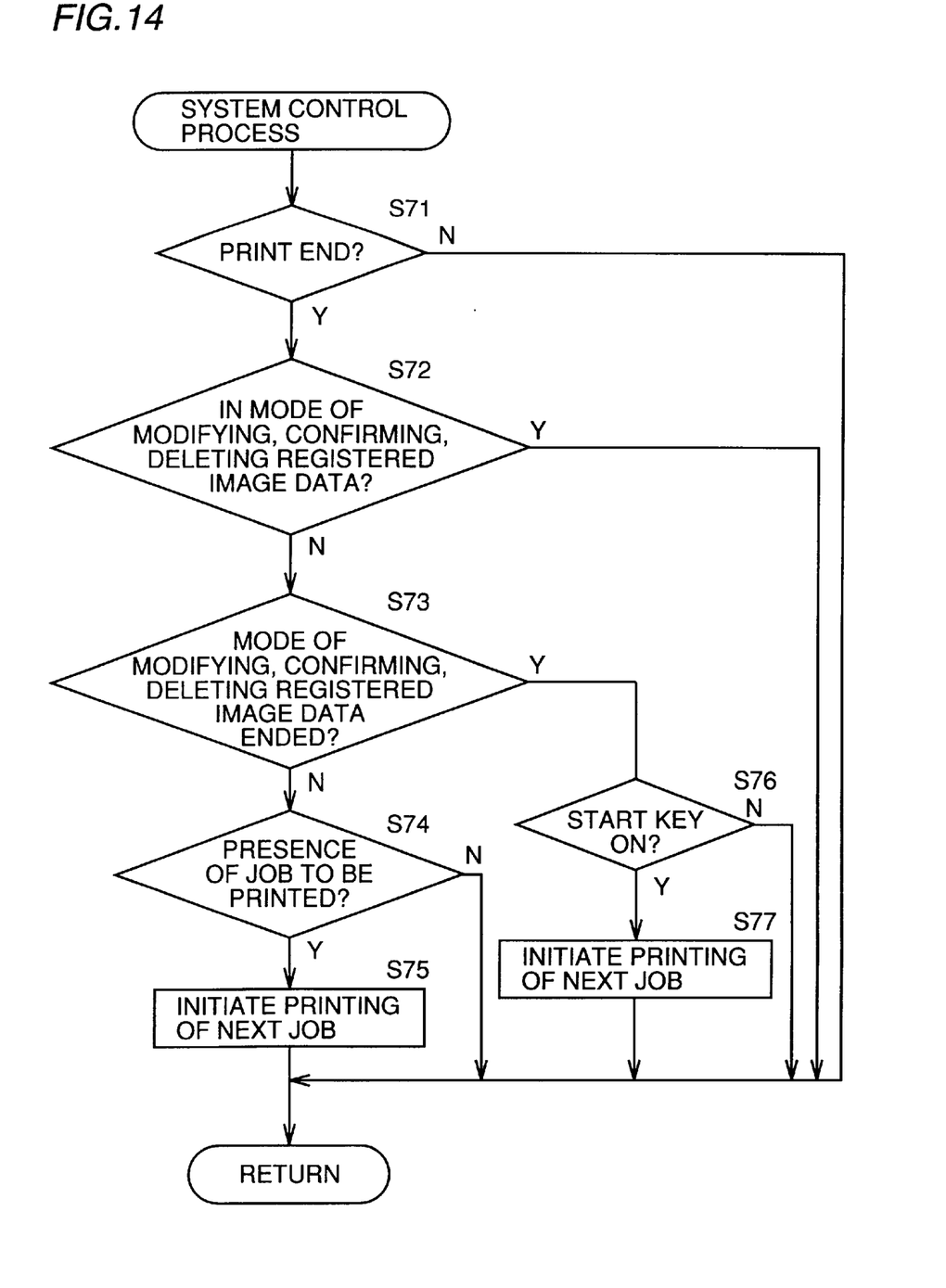
FIGS. 14, 15 and 16 are flow charts showing the control procedure of a system control process according to second, third, and fourth embodiments, respectively, of the present invention.

FIG. 14 is a flow chart showing the control procedure of the system control process according to a second embodiment of the present invention.

At step S71, determination is made whether the printing operation has ended or not. When NO at S71, the control returns to the main routine. If the printing operation has ended (YES at S71), control proceeds to S72 to determine whether a flag is set indicating that the mode to confirm, erase and modify the image data for a registered original group (corresponding to the user operation of FIGS. 8–11) through operation panel 300 (refer to FIG. 2) has been selected.

When YES at S72, the control returns to the main routine. A print out of a job subsequent to the job which has ended printing at S71 will not be initiated when the mode to confirm, erase, and modify the image data of the registered original group is selected. Thus, print out of an image of a job that is to be confirmed, erased, modified and the like by the user is inhibited.

When a flag is not set indicating that the edit mode is selected (NO at S72), the control proceeds to S73 to determine whether the mode of confirming, erasing, and modifying the image data of a registered original group has ended or not. When NO at S73, the control proceeds to S74 to determine whether there is a job that is to be printed. When there is no job waiting for print out (NO at S74), the control returns to the main routine. When YES at S74, the control proceeds to S75 to initiate print out of the next job.

When the mode to confirm, erase, and modify the image data of the registered original group has ended (YES at S73), the control proceeds to S76 to determine whether start key 306 (refer to FIG. 2) is depressed or not through operation panel 300. When NO at S76, the subroutine ends. When start key 306 is depressed (YES at S76), the control proceeds to S77 to initiate printing of the next job. Thus, printing of the next job is not initiated until the user confirms the completion of the process of the mode to confirm, erase, and modify the image data of a registered original group and depresses start key 306.

As described above, when the mode to confirm, erase, and modify the image data of a registered original group is selected, printing of the next job cannot be initiated. When the selection in the edit mode ends and start key 306 is depressed, printing of the next job can be initiated. Even when the user erroneously ends the confirmation, erasure, and modification mode of the image data of a registered original group, the user can select the appropriate mode again to process the image data of a registered original group.

Figure 15:
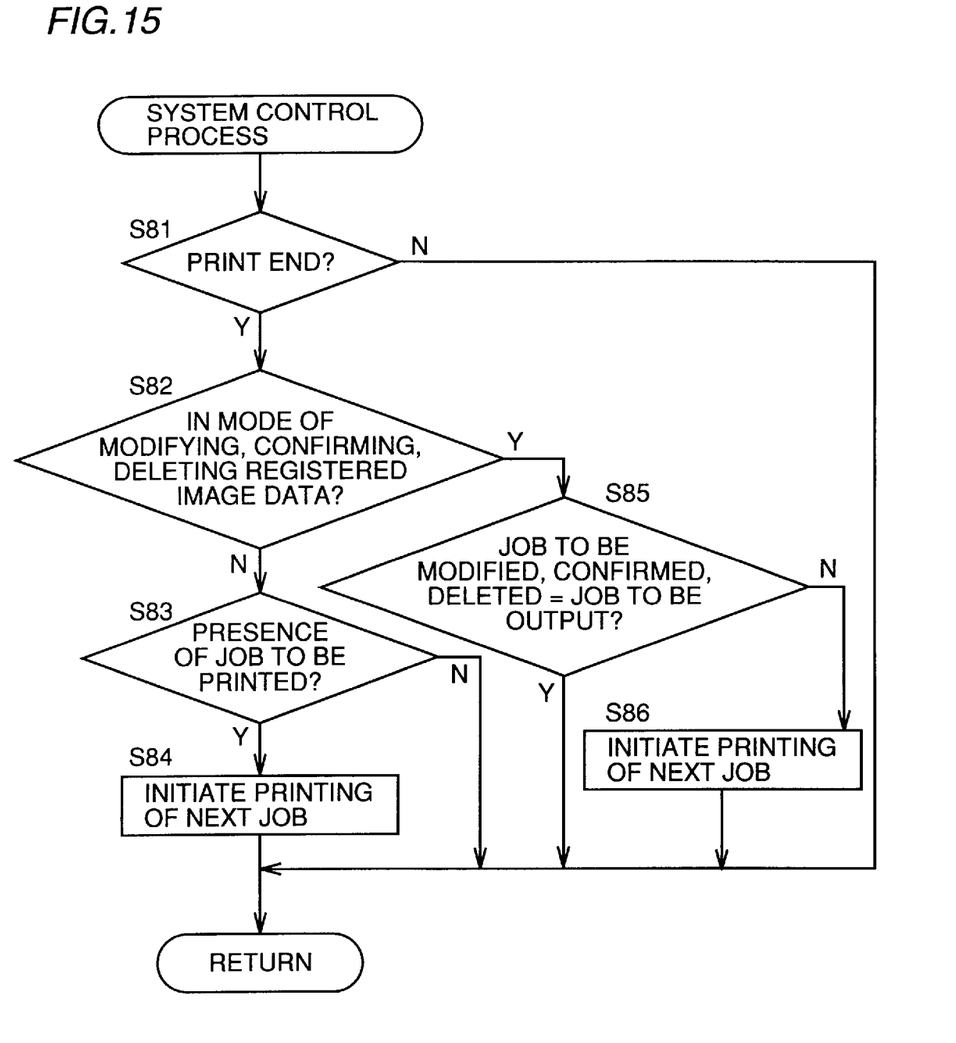

FIG. 15 is a flow chart showing the control procedure of the system control process according to a third embodiment of the present invention.

At step S81, determination is made whether printing has ended or not. When NO at S81, the control returns to the main routine. When YES at S81, the control proceeds to S82 to determine whether a flag is set indicating selection of a mode (corresponding to the user operation shown in FIGS. 8–11) to confirm, erase, and modify the image data of a registered original group.

When a flag is set indicating that the edit mode is selected (YES at S82), the control proceeds to S85 to determine whether the job of interest of the edit mode is the job to be printed out. When YES at S85, the present routine ends. When the mode to confirm, erase and modify the image data of a registered original group is selected and the job of the selected mode is the job to be subsequently output, printing of a job subsequent to the job that has been printed at S81 will not be initiated.

When the job of the mode to confirm, erase, and modify the image data of a registered original group is not the job that is to be printed out (NO at S85), the control proceeds to S86 to initiate printing of the next job. Then, the present routine ends.

When a flag is not set indicating that the edit mode is selected (NO at S82), the control proceeds to S83 to determine whether there is a job in a standby state to be printed. When NO at S83, the control returns to the main routine. When YES at S83, the control proceeds to S84 to initiate printing of the next job. Therefore, after confirming, erasing, and modifying image data of a registered original group, printing of the next job will be initiated automatically.

Thus, when the mode to confirm, erase, and modify the image data of a registered original group is selected, and the job of the selected mode is the job to be printed out, the printing will not be initiated. Thus, the user can appropriately process the image data of a registered original group.

Figure 16:
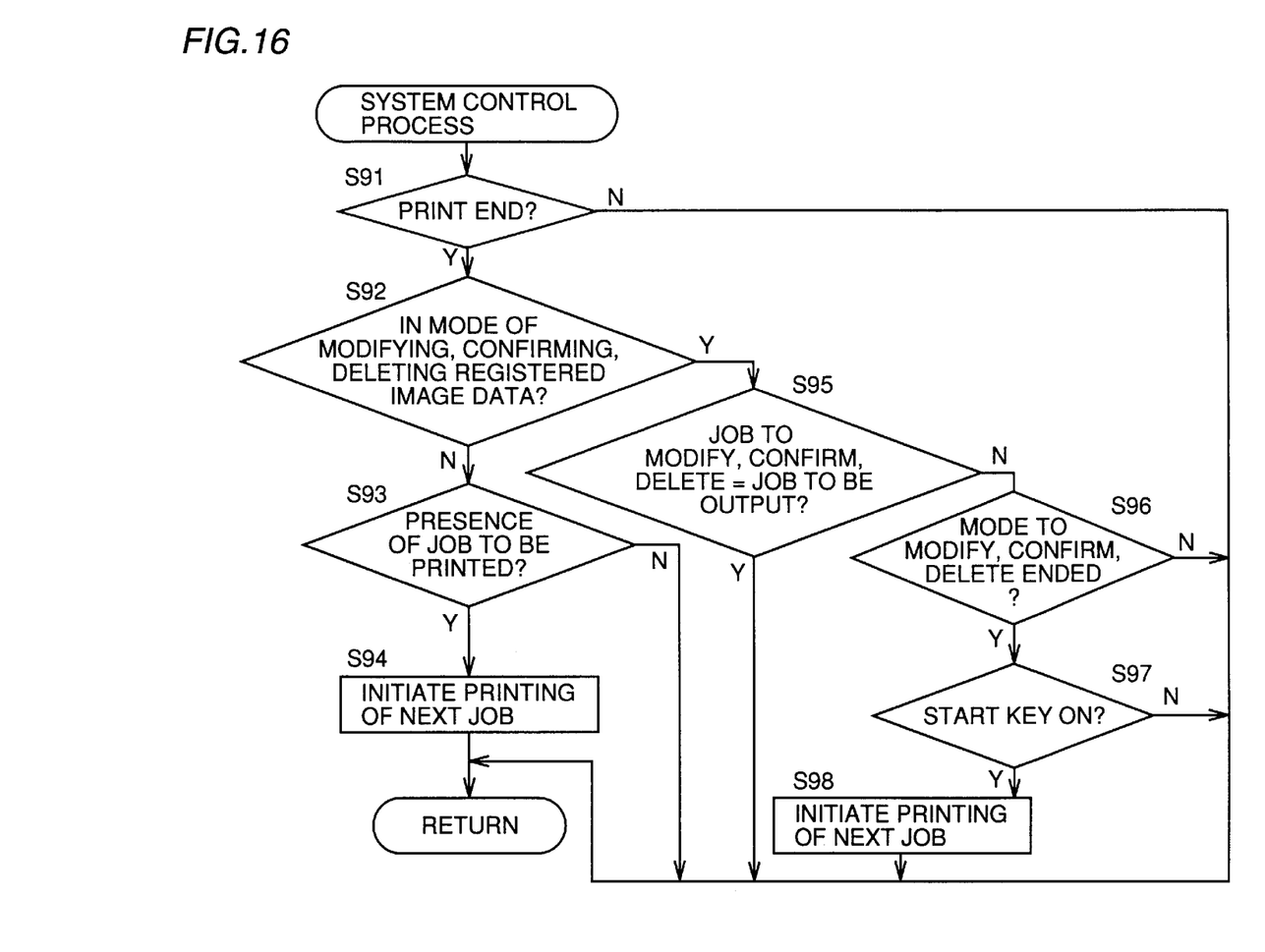

FIG. 16 is a flow chart showing the procedure of the system control process according to a fourth embodiment of the present invention.

At S91, determination is made whether printing has ended or not. When NO at S91, the control returns to the main routine. When YES at S91, the control proceeds to S92 to determine whether a flag is set indicating that the mode to confirm, erase, and modify image data of a registered original group (corresponding to the user operation shown at FIGS. 8–11) is selected through operation panel 300 (refer to FIG. 2).

When a flag is not set indicating that the mode is selected (NO at S92), the control proceeds to S93 to determine whether there is a job in a standby state for printing. When NO at S93, the subroutine ends. When YES at S93, the control proceeds to S94 to initiate printing of the next job.

When a flag is set indicating that the edit mode is selected (YES at S92), the control proceeds to S95 to determine whether the job of the selected mode is the job to be printed out. When YES at S95, the subroutine ends. Thus, when the mode to confirm, erase, and modify the image data of a registered original group is selected, and the job of the mode is the job to be output, printing of a job subsequent to the job that has been printed out at S91 will not be initiated.

When the job of the mode to confirm, erase, and modify image data of a registered original group is not the job to be printed out (NO at S95), the control proceeds to S96 to determine whether the mode of confirmation, erasure, and modification has ended or not. When NO at S96, the subroutine ends. When YES at S96, the control proceeds to S97 to determine whether start key 306 is depressed or not. When NO at S97, the subroutine ends. When YES at S97, the control proceeds to S98 to initiate the next printing. Thus, only after depression of start key 306 when confirmation, erasure, and modification of image data of a registered original group has ended will the printing of a job that has been processed is allowed.

Thus, when the mode to confirm, erase, and modify image data of a registered original group is selected, printing of the job that is of interest of the mode will not be initiated. Printing of this job can be initiated only after the user confirms completion of the process of the edit mode and depresses start key 306. Even when the user erroneously ends the confirmation, erasure, and modification process of image data of a registered original group, the user can select the mode again to appropriately process the image data of the registered original group.

It is assumed that various processes such as confirmation, erasure, modification, and the like of image data of a registered original group in the above embodiments are included in the editing process defined in the scope of claims for patent.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus that can sequentially read a plurality of original groups while simultaneously forming an image of a read original group, said image forming apparatus comprising:

an input unit for reading an original and entering image data, a memory for storing the image data entered by said input unit, an editor for editing image data stored in said memory, and an inhibit unit for inhibiting output of the image data of an original group stored in said memory during an editing process by said editor other than the image data of an original group corresponding to an image being formed at the time an editing process by said editor is initiated.

2. The image forming apparatus according to claim 1, wherein an original group that is inhibited of output by said inhibit unit is the image data of an original group which is being subjected to an editing process by said editor.

3. The image forming apparatus according to claim 2, further comprising a controller to automatically initiate output of the image data of an original group that has been edited after an editing process by said editor ends.

4. The image forming apparatus according to claim 2, further comprising a designating unit to designate initiation of output of the image data of an original group that has been edited after an editing process by said editor ends.

5. The image forming apparatus according to claim 1, wherein the image data of an original group that is inhibited of output by said inhibit unit is the image data of an original group that is not being subjected to an editing process by said editor.

6. The image forming apparatus according to claim 5, further comprising an initiation unit for automatically initiating output of the image data of an original group after an editing process by said editor ends.

7. The image forming apparatus according to claim 5, further comprising a designating unit for designating initiation of output of the image data of an original group after an editing process by said editor ends.

8. An image forming apparatus comprising:

an input unit for entering an image of an original group, a memory for storing an image entered by said input unit, an output unit for providing an image stored in said memory, wherein said output unit, after output of an image of a first original group, automatically initiates output of an image of a second original group different from said first original group, an editor for editing an image stored in said memory, wherein, after an output of the image of said first original group, the output of the image of said second original group is inhibited during an editing process by said editor.

9. The image forming apparatus according to claim 8, further comprising an intiation unit for automatically initiating output of an image of a new original group after an editing process by said editor ends.

10. The image forming apparatus according to claim 8, further comprising a designating unit for designating initiation of output of an image of a new original group after an editing process by said editor ends.

11. An image forming apparatus comprising:

a memory for storing a plurality of original groups, a printer for sequentially printing the plurality of original groups stored in said memory, an editor for applying an editing process on an original group stored in said memory, and an inhibit unit for inhibiting printing of an image of an original group that is currently being subjected to an editing process by said editor until after an editing process by said editor ends.

12. The image forming apparatus according to claim 11, further comprising a controller for automatically initiating printing of an image of an original group that has been edited after an editing process by said editor ends.

13. The image forming apparatus according to claim 11, further comprising a designating unit for designating initiating printing of an image of an original group that has been edited after an editing process by said editor ends.

14. An image forming apparatus for sequentially outputting an image of an original group while sequentially entering an image of a plurality of original groups into a memory, said image forming apparatus comprising:

an editor for editing an image in said memory, and an inhibit unit for inhibiting an output of an original group for forming an image during an editing process by said editor other than an original group corresponding to an image being formed at the time an editing process by said editor is initiated.

15. The image forming apparatus according to claim 14, further comprising an initiation unit for automatically initiating output of an original group for forming a new image after an editing process by said editor ends.

16. The image forming apparatus according to claim 14, further comprising a designating unit for designating initiation of an output of an original group for forming a new image after an editing process by said editor ends.

17. An image forming apparatus for outputting sequentially an image of an original group while sequentially entering an image of a plurality of original groups into a memory, said image forming apparatus comprising:

an editor for editing an image stored in said memory, and an inhibit unit for inhibiting an output of an original group that is currently subjected to an editing process by said editor until after an editing process by said editor ends.

18. The image forming apparatus according to claim 17, further comprising a cancel unit for canceling output inhibition of an image of an original group that has been edited after an editing process by said editor ends.

19. The image forming apparatus according to claim 17, further comprising a controller for automatically initiating output of an original group that has been edited after an editing process by said editor ends.

20. The image forming apparatus according to claim 17, further comprising a designating unit for designating initiation of an output of an original group that has been edited after an editing process by said editor ends.

* * * * *